United States Patent [19]
Murakami et al.

[11] Patent Number: 4,999,461
[45] Date of Patent: * Mar. 12, 1991

[54] COORDINATES INPUT APPARATUS

[75] Inventors: Azuma Murakami; Teruyoshi Hagiwara; Yoichi Tuchida; Hideki Johno, all of Saitama, Japan

[73] Assignee: Wacom Co., Ltd., Saitama, Japan

[*] Notice: The portion of the term of this patent subsequent to Jul. 18, 2006 has been disclaimed.

[21] Appl. No.: 354,333

[22] Filed: May 19, 1989

Related U.S. Application Data

[62] Division of Ser. No. 206,404, Jun. 14, 1988, Pat. No. 4,848,496.

[30] Foreign Application Priority Data

Jun. 16, 1987 [JP] Japan .................. 62-148055

[51] Int. Cl.$^5$ .............................................. G08C 21/00
[52] U.S. Cl. ....................................................... 178/19
[58] Field of Search .................... 178/18, 19; 364/520, 364/709; 340/706, 707, 708

[56] References Cited

U.S. PATENT DOCUMENTS

| | | | |
|---|---|---|---|
| 3,299,424 | 1/1967 | Vinding ................. | 343/6.5 |
| 4,609,776 | 9/1986 | Murakami et al. ..... | 178/18 |
| 4,616,106 | 10/1986 | Fowler et al. .......... | 178/18 |
| 4,697,050 | 9/1987 | Farel et al. ............. | 178/18 |
| 4,697,244 | 9/1987 | Murakami et al. ..... | 364/520 |
| 4,709,209 | 11/1987 | Murakami et al. ..... | 178/18 |
| 4,713,496 | 12/1987 | Kimura et al. ......... | 178/18 |
| 4,831,566 | 5/1989 | Matthews .............. | 364/571.05 X |
| 4,848,496 | 7/1989 | Murakami et al. ..... | 178/19 |
| 4,878,553 | 11/1989 | Yamanami et al. .... | 178/18 |

Primary Examiner—Stafford D. Schreyer
Attorney, Agent, or Firm—Lowe, Price, LeBlanc, Becker & Shur

[57] ABSTRACT

A coordinates input apparatus has a tablet including X- and Y-direction position detecting portions having a multiplicity of loop coils arranged in parallel with one another in X- and Y-directions, respectively, the X- and Y-direction position detecting portions being superposed one on the other. The apparatus also has a position appointing device incorporating a tuning circuit capable of making resonance with electric wave produced from one of the loop coils. The loop coils are successively selected in a one-by-one fashion and an A.C. signal of a predetermined frequency is supplied to the thus selected loop coil. The electric wave causes a tuning of the tuning circuit in the position appointing device so that a voltage of a frequency substantially the same as the above-mentioned predetermined frequency is generated in the loop coil which is near the position appointing device. The position appointed by the position appointing device is therefore detected by sensing the induced voltage of a frequency substantially equal to the predetermined frequency of the A.C. voltage, through a processing by a suitable processing device. Since the position appointing device need not be connected to any stationary portion of the apparatus, the coordinates data can be input with a high degree of maneuverability and with a distinguished precision. It is also possible to display the data input through the position appointing device or the data transmitted thereto through a transmission line.

48 Claims, 9 Drawing Sheets

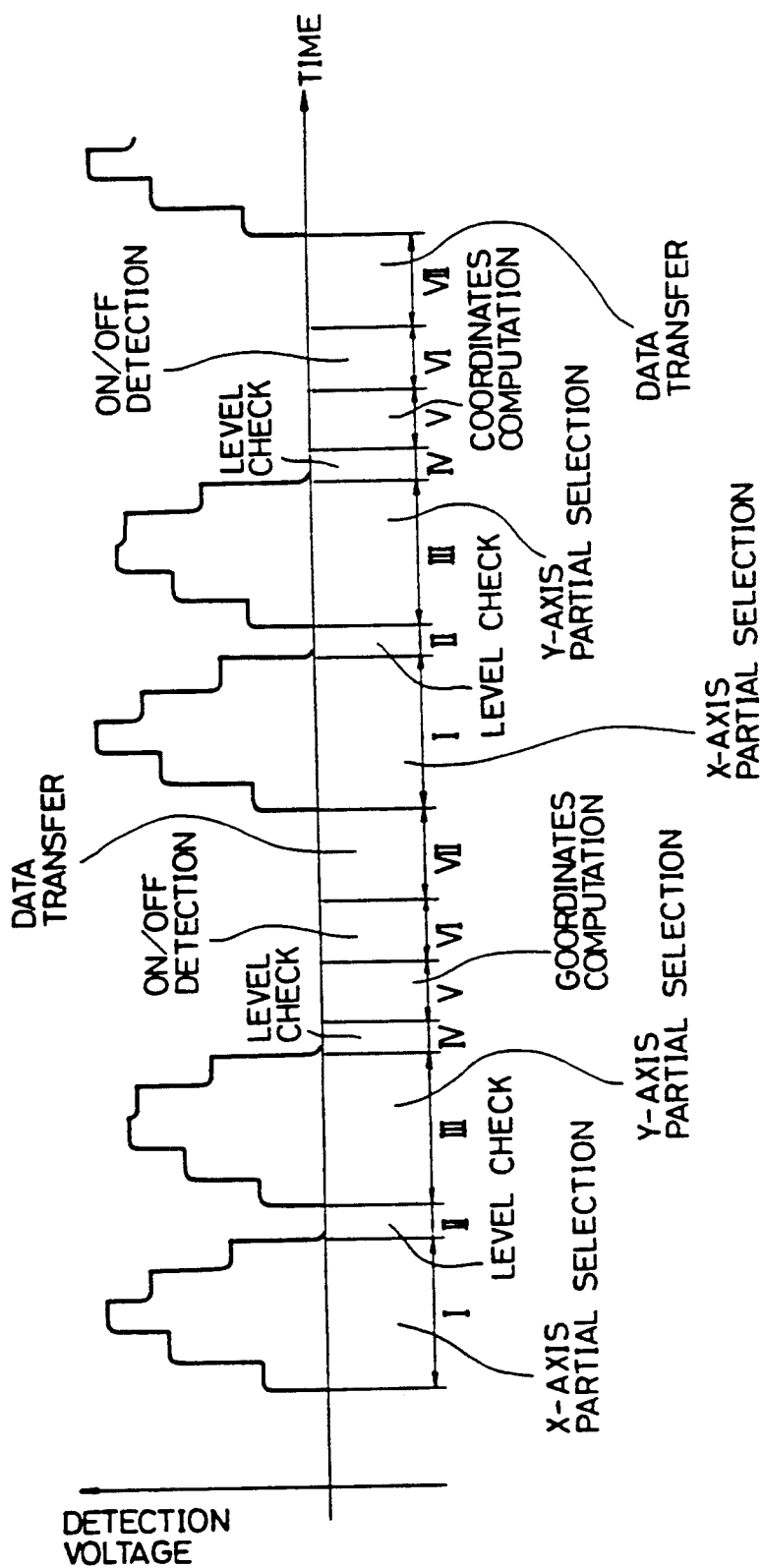

COORDINATES INPUT APPARATUS

This is a continuation of application Ser. No. 206,404, filed on June 14, 1988 now U.S. Pat. No. 4,848,496.

BACKGROUND OF THE INVENTION

1. Field of the Invention

The present invention relates to a coordinates input device including a position appointing device having superior maneuverability and capable of inputting coordinates data with a high degree of precision. More particularly, the present invention is concerned with a coordinates input apparatus capable of transmitting hand-written characters and patterns through, for example, a telephone network and capable of displaying characters and patterns which have been transmitted thereto.

2. Description of the Prior Art and its Problems

A coordinates input apparatus has heretofore been known having a magnetostrictive transmission medium, a position appointing device, a driving coil provided on one end of the magnetostrictive transmission medium or the pointing end of the position appointing device, and a detection coil provided on the pointing end of the position appointing device or one end of the magnetostrictive transmission medium, wherein a pulse current is supplied to the driving coil so as to generate a magnetostrictive vibration wave in the magnetostrictive transmission medium and the vibration wave propagating through the magnetostrictive transmission medium induces a voltage in the detection coil, whereby the position of the position appointing device is determined through processing the time interval between the application of the driving pulse current and the detection of the induced voltage by a suitable processing means.

In another known coordinates input apparatus, a plurality of driving lines and a plurality of detection lines are arranged orthogonally to each other thus forming a matrix. In operation, a position is detected by a position appointing apparatus having a magnetic member such as a ferrite, and driving current is supplied to the successive driving lines while the successive detection lines are scanned, whereby the appointed position is determined as the position on the detection line in which a specifically high voltage is induced.

The position detection apparatus of the first mentioned type exhibits a considerably high degree of position detection but undesirably requires a cord for exchange of timing signals between the position appointing device and the processing device and other portions of the apparatus. In consequence, the handling is undesirably restricted due to the presence of the cord. In addition, it is necessary that the position appointing device be held perpendicularly to the magnetostrictive transmission medium and in close proximity to the magnetostrictive transmission medium.

The second type of the apparatus is advantageous in that it can provide a cordless construction. Unfortunately, however, the resolution is determined by the pitch of the lines. For attaining a high resolution, it is necessary that the pitch of the lines be reduced. A smaller pitch of the lines, however, impairs the S/N ratio and the stability, so that a difficulty is encountered in the improvement in resolution. In addition, it is generally difficult to detect the positions right above the crossing points of the driving lines and the detection lines. It is also to be pointed out that the position appointing device has to be placed in the very close proximity of the lines. It has also been known to transmit pattern data through, for example, telephone networks. In such a case, the pattern data is transmitted either in the form of analog data through facsimile or after conversion into predetermined digital data through an image scanner and a personal computer, in the form of modulation/demodulation circuit (MODEM).

The facsimile and the image scanner, however, can read only the characters and patterns drawn or printed on a sheet, and there is no means for directly transmitting the hand-written letters and patterns or for deleting or correcting the content of the data. In addition, an impractically long time is required for the reading of the data.

SUMMARY OF THE INVENTION

Accordingly, an object of the present invention is to provide a coordinate input apparatus which incorporates a position appointing device havinq superior maneuverability and capable of inputting coordinates data with a high degree of precision, and which is capable of transmitting hand-written letters and patterns through a telephone network and displaying letters and patterns which have been transmitted thereto.

A second object of the present invention is to provide a coordinates input apparatus incorporating a display unit having the same size as the tablet and superposed on the tablet. According to this coordinate input apparatus, it is possible to input the coordinate data of the letters and patterns to the tablet across or through the display unit, while visually checking the result of the input on the coordinates of the display. It is therefore possible to conduct the input of the data with a high degree of precision.

A third object of the present invention is to provide a coordinates input apparatus ahving ₄a display unit smaller than the tablet and superposed on the portion of the tablet other than the input region of the tablet. According to this arrangement, the operator can input the coordinates data of letters and patterns while confirming the result of the input through the display unit which is provided on a portion of the tablet other than the input region thereof, thus attaining a high degree of precision of the input operation. In addition, diversification fo the input work such as input with reference to the reference data displayed on the display unit can be realized.

In accordance with one aspect of the present invention, the position of an implement in proximity to a tablet is determined. The implement includes a tuned circuit with a predetermined resonant frequency and the tablet includes coils arranged in two coordiante directions. At least some of the coils are exicted with AC energy having approximately the same frequency as the resonant frequency. The tuned circuit interacts with the AC energy to change the AC current flowing in at least some fo the coils as a function of the implement position relative to the tablet. In response to the amplitude of AC current flowing in at least some fo the coils, the implement position is indicated by detecting the amplitude value of the current in a plurality of the coils. Indications of the amplitude value of the current flowing in the plural coils are combined to enable implement position to be determined.

In accordance with another aspect of the invention, the position of an implement adapted to be moved relative to a surface of a tablet is determined and displayed.

The implement includes a tuned cirucit with a resonant frequency and the tablet includes a series of coils arranged in two coordinate directions of the surface. At least some of the ocils are connected with an AC energy source for applying approximately the same frequency as the resonant frequency to the coils. The tuned circuit interacts with the AC energy to change the AC current flowing in at least some of the coils as a function of the implement position.

A display indicates implement position relative to a surface of the tablet in response to the change in AC current resulting from the interaction of the AC energy and the tuned circuit.

In one aspect of the invention, the implement position indication is enabled by detecting a predetermined phase relation for the current flowing in the coils. In accordance with another aspect of the invention, the implement position is indicated by interpolating between the amplitude of the current flowing in adjacent coils.

In accordance with a further aspect of the invention, the implement position is indicated by detecting the amplitude of the current change in the coil having the greatest change and in the coils adajcent the coil having the greatest change. There is an interpolating between values of current change between the coil having the greatest change and the coils adjacent thereto. Preferably, the change is detected by exciting the coils during a first interval with the AC energy at the predetermined frequency. During a second interval, while the coils are not exicted by the AC energy at the predetermined frequency, there is a response to energy coupled back to the coils from the tuned circuits.

In one embodiment, a display is superposed on the tablet. There is a response to the indicated implement position to indicate the position of the implement relative to the display.

Other objects, features and advantages of the present invention will become clear from the following description of the preferred embodiments when the same is read in conjunction with the accompanying drawings.

BRIEF DESCRIPTION OF THE PREFERRED DRAWINGS

Figure 7:
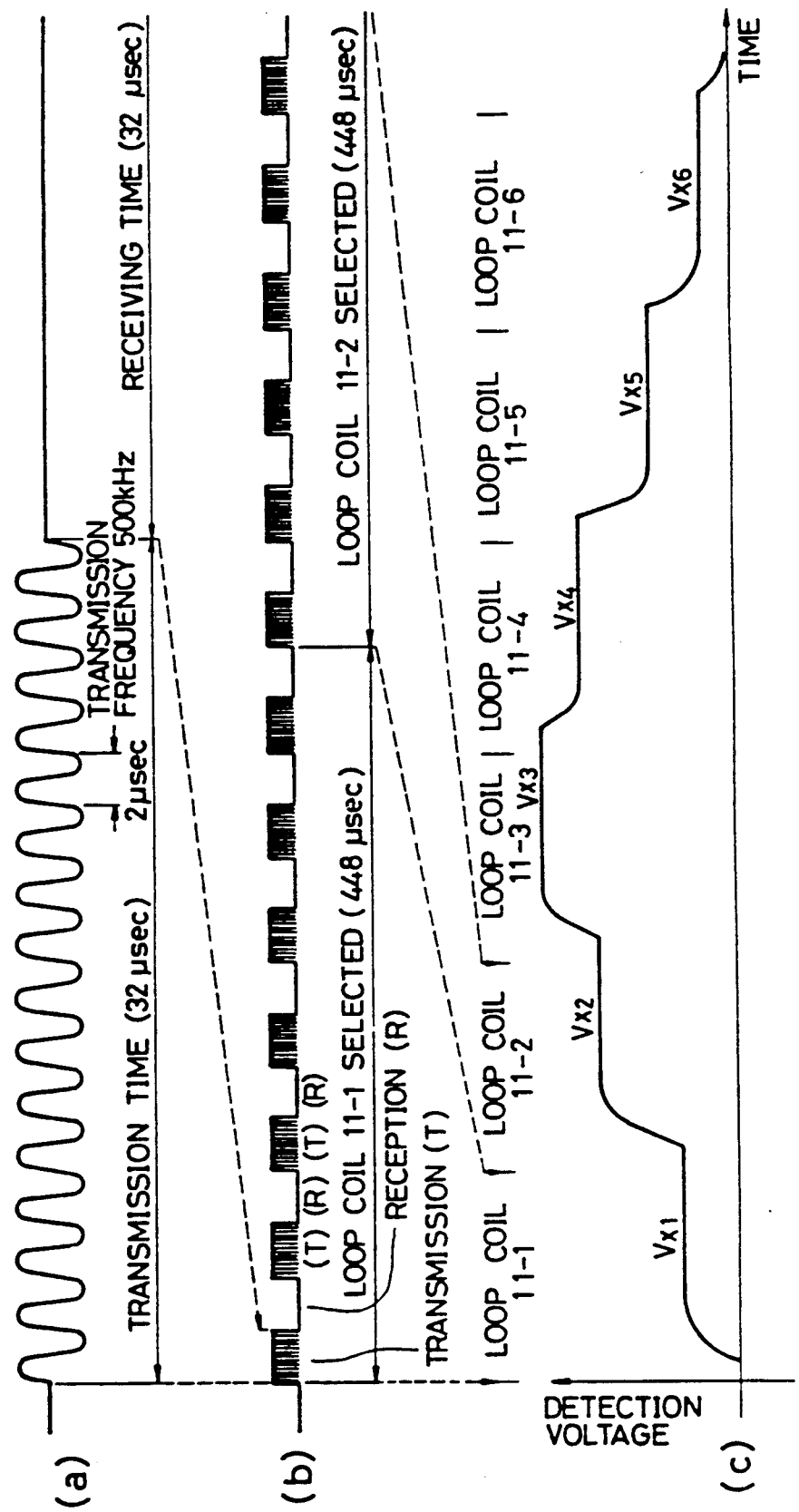
Figure 8:
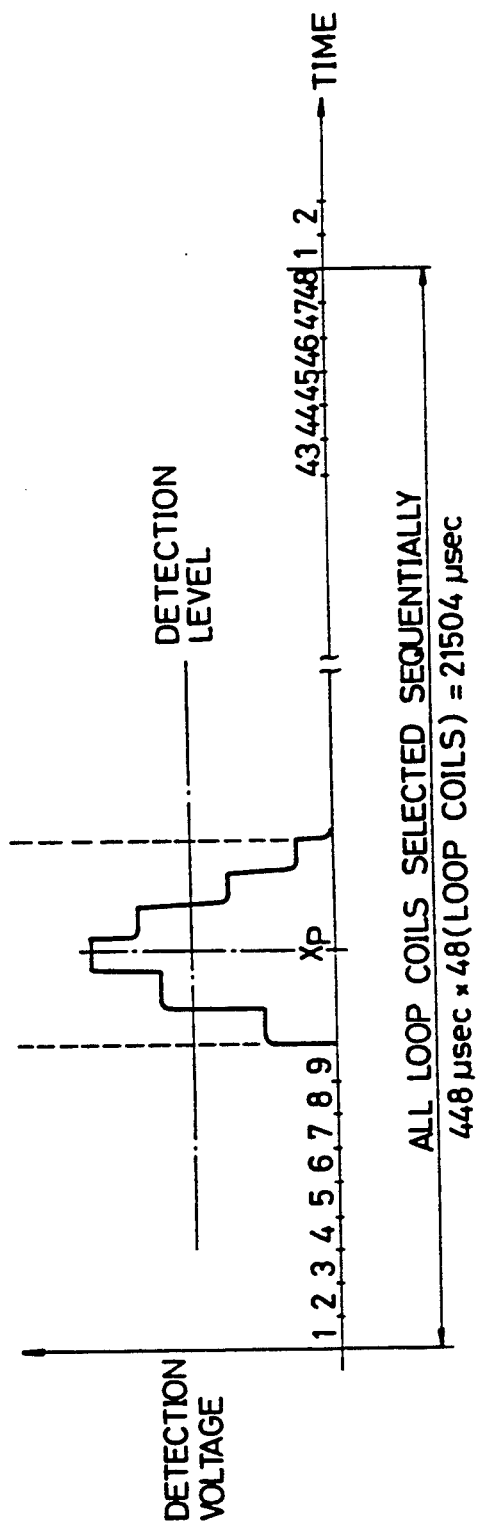

FIGS. 7(a), 7(b) and 7(c) are timing charts illustrating basic position detecting operation in the position detection circuit;

FIG. 8 is an illustration of the voltage detected from loop coils; and

FIG. 9 is a timing chart illustrating the operation of the position detection and the operation of discrimination of states in the second and subsequent detection cycles.

DETAILED DESCRIPTION OF THE PREFERRED EMBODIMENTS

Figure 1:
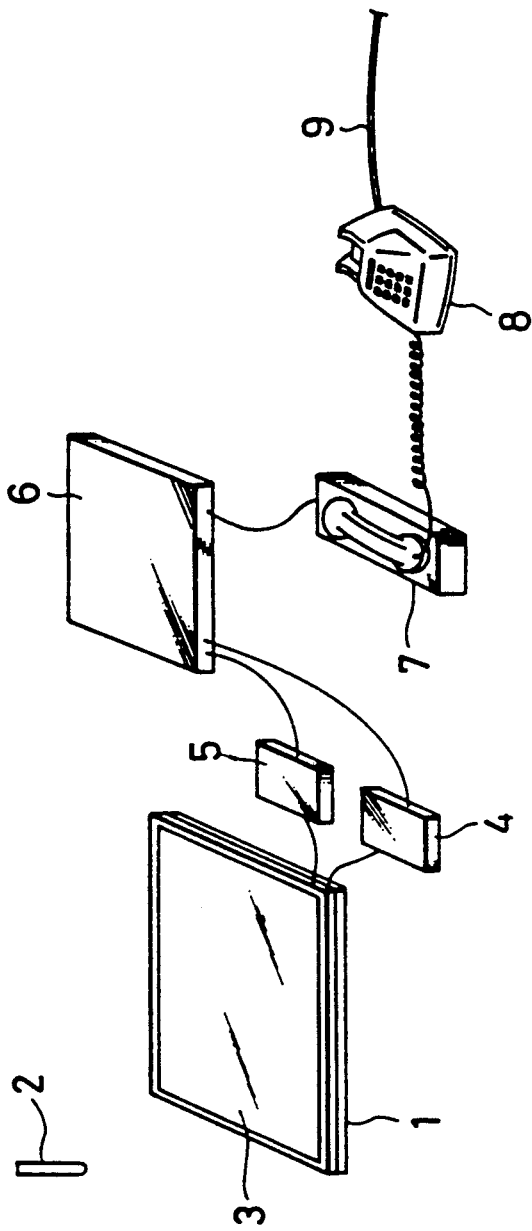
FIG. 1 is a prespective view illustrating the outline of the coordinate input apparatus of the present invention.

Referring first to FIG. 1 which illustrates the outline fo the coordinates input apparatus of the present invention, the apparatus has a tablet 1 for receiving input coordinates data, a position appointing device 2 for appointing a position on the tablet, e.g., a stylus pen, a flat planar display 3 superposed on teh tablet 1, a position detection circuit 4 for detecting the coordinate values of the position appointed on the tablet 1 by the stylus pen, a control circuit 5 for driving the display 3, a processing unit 6, and a modulation and demodulation circuit 7 for converting the data signal into transmission signals and inverse conversion, e.g., an acoustic coupler. Also included are a telephone 8, and a telephone network 9.

Figure 2:
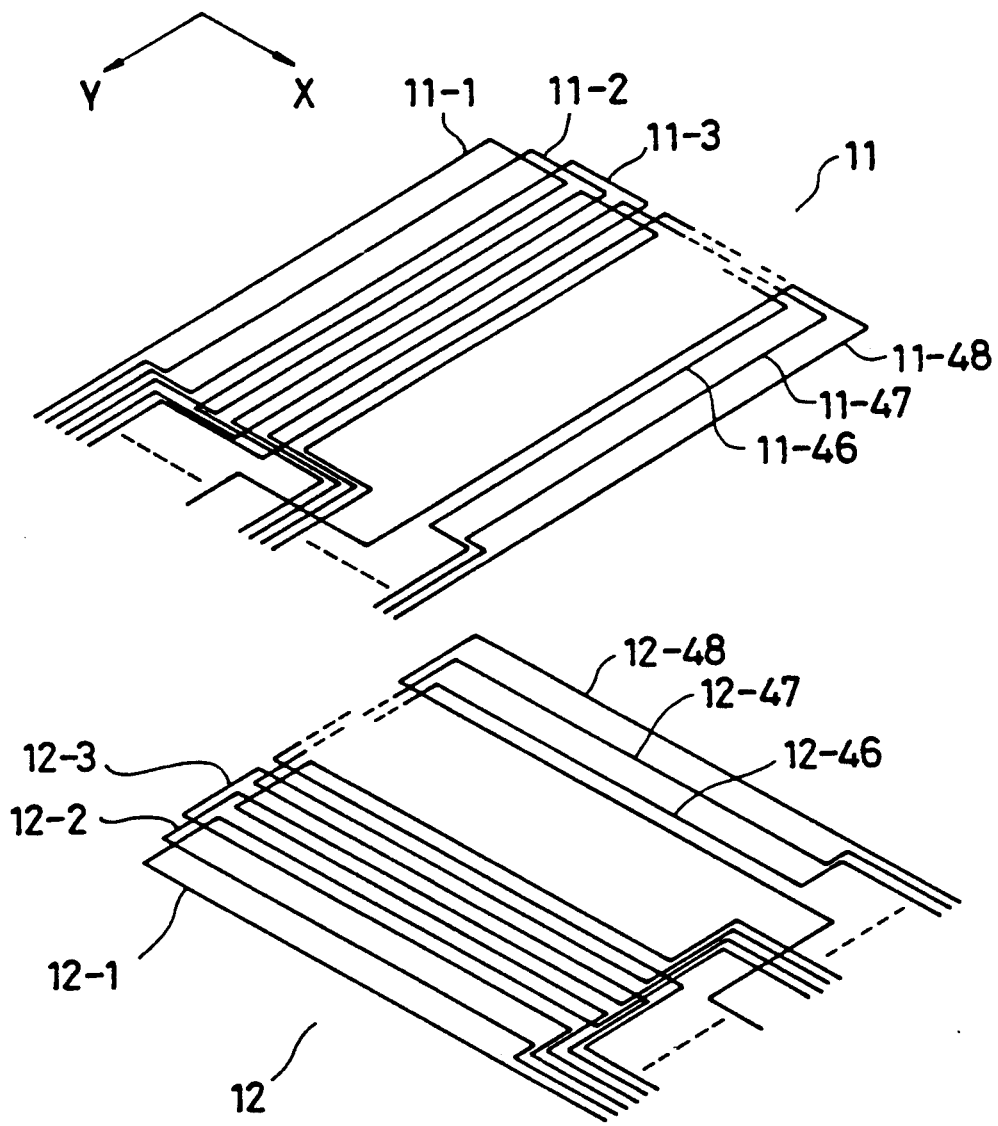
FIG. 2 is an illustration of the detail of the position detecting portion of the tablet for determining the position in X- and Y-directions.

FIG. 2 illustrates the detail of the X-direction position detecting portion 11 and a Y-direction position detecting portion 12 for determining the appointed position in the X- and Y-direction, the position detecting means 11 and 12 constituting the tablet 1. The X-direction position detecting portion 11 is constituted by a multiplicity of, e.g., 48, loop coils 11-1, 11-2, . . . , 11-48 which extend in the X-direction in parallel with one another and which are arranged such that adjacent loop coils are partially superposed one on the other. Similarly, the Y-direction position detecting portion is constituted by a multiplicity of, e.g., 48, loop coils 12-1, 12-2, . . . , 12-48 which extend in the Y-direction in parallel with one another and which are arranged such that the adjacent loop coils are partially superposed one on the other. The X-direction position detecting portion 11 and the Y-direction position detecting portion 12 are superposed one on the other in close contact with each other, although both position detecting means are illustrated as being separated from each other for the purpose of clarification. The X-direction and Y-direction position detecting means are encased in a case made of a metallic material.

Although in the illustrated embodiment each loop coil is constituted by a single turn, the loop coil may have a plurality of turns. The position detecting portions can be obtained by forming a multiplicity of parallel grooves by etching in a printed board which is known per se and connecting them by jumper lines, thus completing a multiplicity of loop coils.

Figure 3:
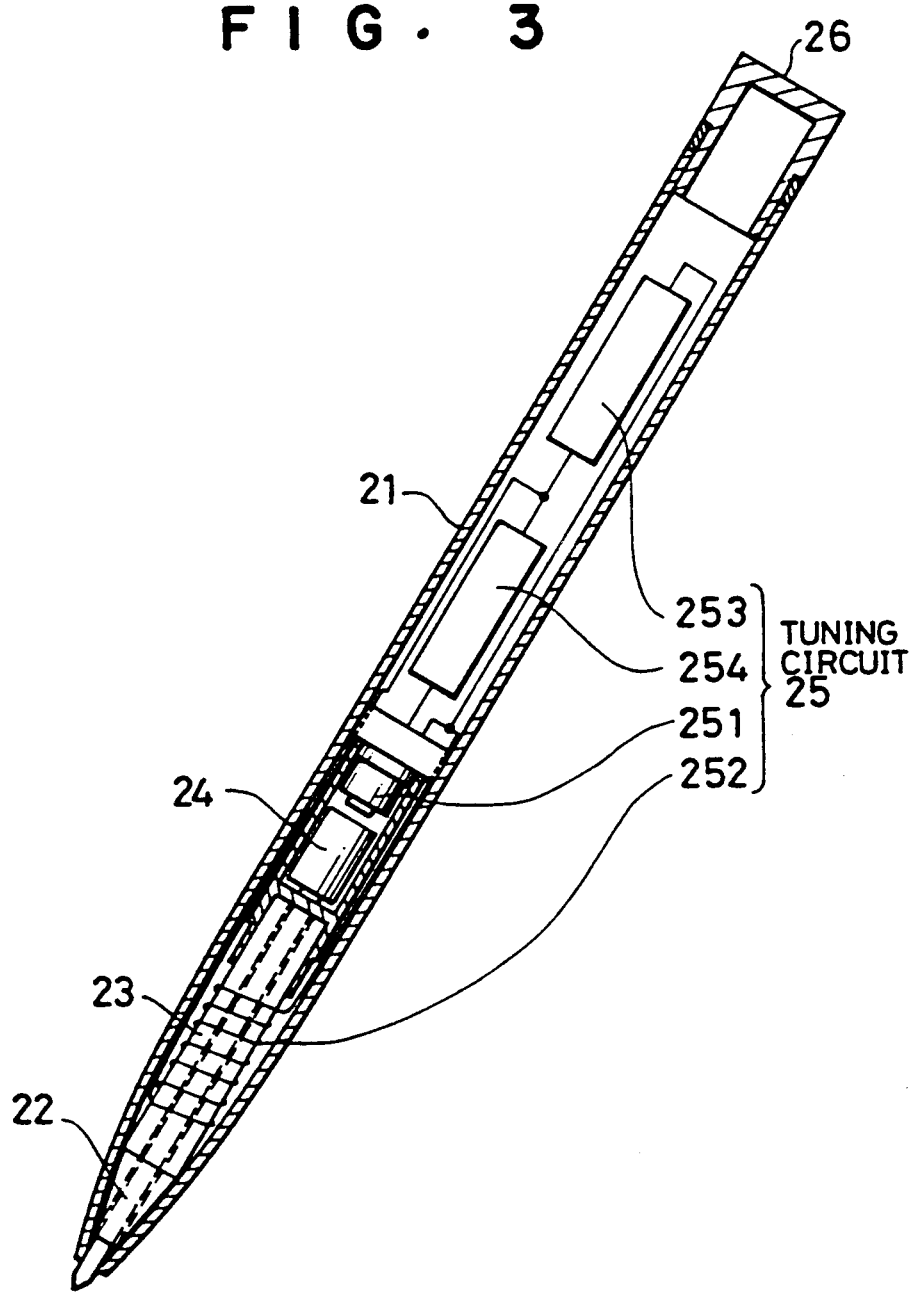
FIG. 3 is a sectional view of a stylus pen.

FIG. 3 is an illustration of the detail of the construction of a stylus pen (referred to simply as "pen" hereinunder) 2. The pen 2 has a shaft or stem 21 made from a non-metallic material such as plastic. The stem 21 integrally receives various parts including a core 22 such as a ball point pen, a ferrite core having a bore which slidably receives the core 22, a coiled spring 24, a switch 251, a coil 252 wound around the ferrite core 23, and a tuning circuit 25 constituted by a coil 252 and capacitors 253 and 254. A cap 26 is attached to the rear end of the pen 2.

Figure 4:
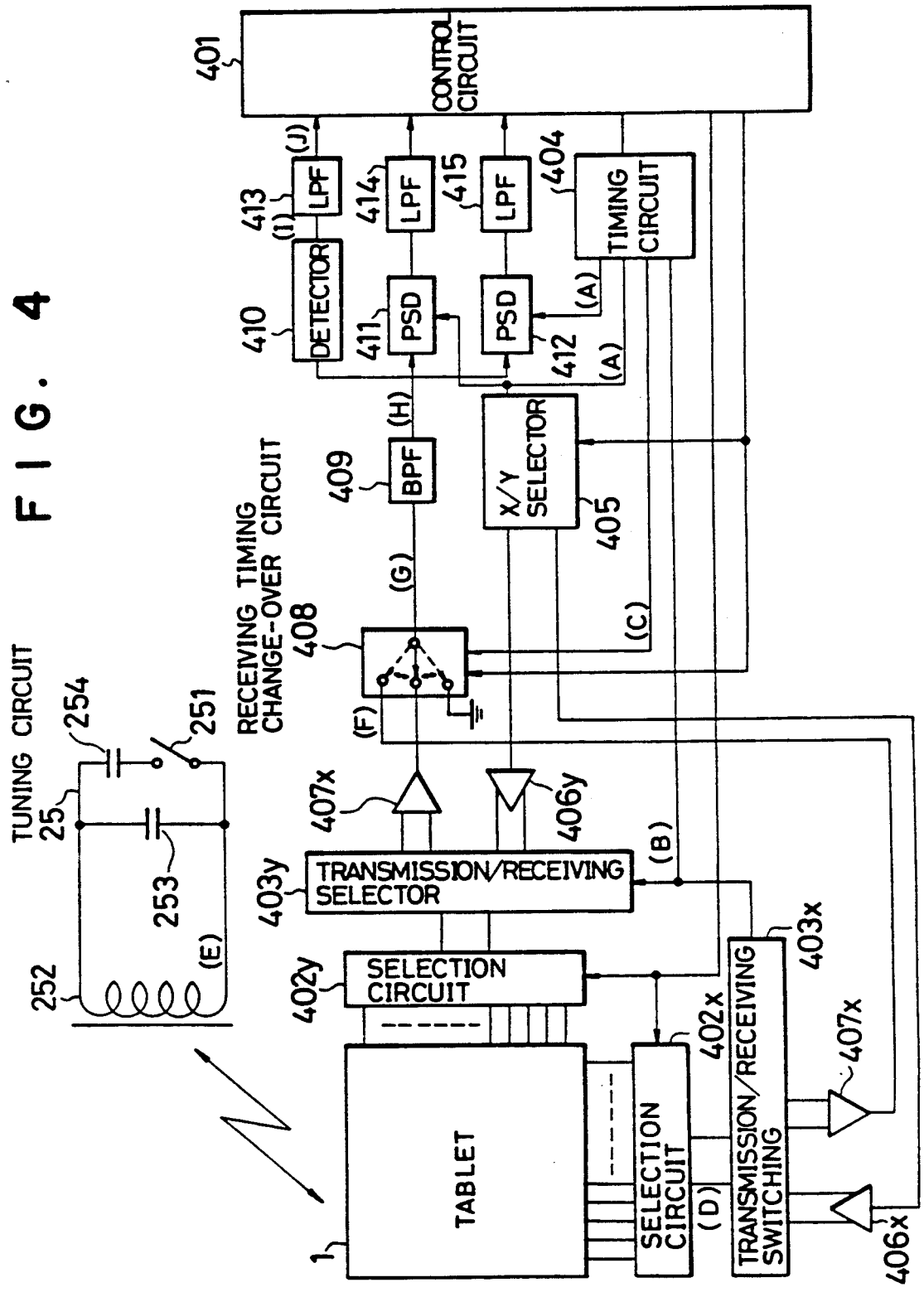
FIG. 4 is an illustration of the detail of the tuning circuit and the position detection circuit of the stylus pen.

As will be seen from FIG. 4, the coil 252 and the capacitor 253 are connected in series as shown in FIG. 4 so as to constitute a resonance circuit which is known per se. The numerical values of the inductance of the coil 252 and the capacitance of the capacitor 253 are so determined that a resonance (tuning) takes place in the synchronized state of the voltage and current at a predetermined frequency $f_0$. The capacitor 254 is connected to both ends of the capacitor 253 through a switch 251. When the switch 251 is turned on, the phase of the current in the above-mentioned resonance circuit is delayed and the phase of a later-mentioned reception signal is delayed by a predetermined angle. In the use of the position appointing device, the user grips the pen 2 at the stem portion 21 and presses the end of the core 22 onto the surface of the display unit 3. As a result, the rear end of the core 22 acts to compress the coiled spring 24, whereby the switch 251 is turned on. The display unit 3 may be a display panel which has a known matrix-type liquid crystal display element composed of a plurality of horizonal and vertical electrodes which are arranged orthogonally, a liquid crystal medium between the electrodes, and a reflecting layer provided on the reverse side of the element and capable of transmitting electric wave. The reflecting layer may be composed of a layer of a white pigment such as titanium oxide or a plate of plastics such as white polyethylene terephthalate. The display unit 3 has a display area which is substantially equal to the area of the coordinate input region of the tablet 1 and is superposed on the tablet 1 in such a manner that the coordinates positions on the display unit 3 correspond to the coordinate positions on the tablet 1.

FIG. 4 shows the detail of the position detection circuit 4, together with the tuning circuit 25. The position detection circuit 4 has a control means or circuit 401, selection means or circuits 402x, 402y, and transmission/receiving change-over means or circuits 403x, 403y. The position detection circuit 4 further includes a timing circuit 404, an x-y change-over circuit 405 and driving circuits 406x, 406y, which in combination constitute transmission/receiving means. The position detection circuit 4 further has receiving means constituted by amplifiers 407x, 407y, a receiving timing change-over circuit 408, a band-pass filter (BPF) 409, a detector 410, phase detectors (PSD) 411, 412, and low-pass filters 413, 414 and 415.

Figure 5:
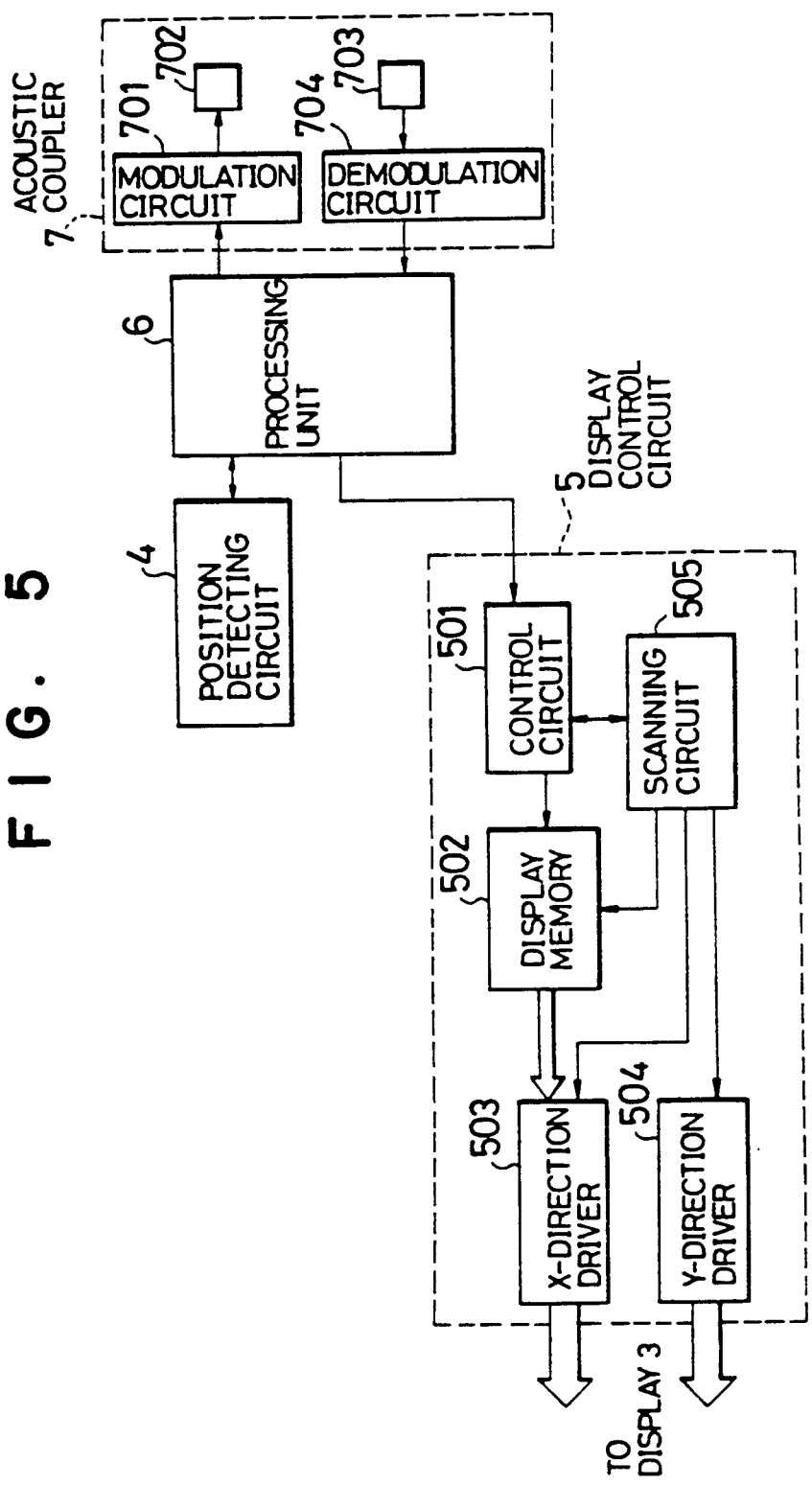
FIG. 5 is an illustration of a display control circuit and an acoustic coupler.

FIG. 5 shows the detail of the display control circuit 5 and an acoustic coupler 7. The display circuit 5 has a control circuit 501, a display memory 502, an X-direction driver 503, a Y-direction driver 504, and a scanning circuit 506. The acoustic coupler 7 has a modulation circuit 701, a speaker 702, a microphone 703 and a demodulating circuit 704.

Figure 6:
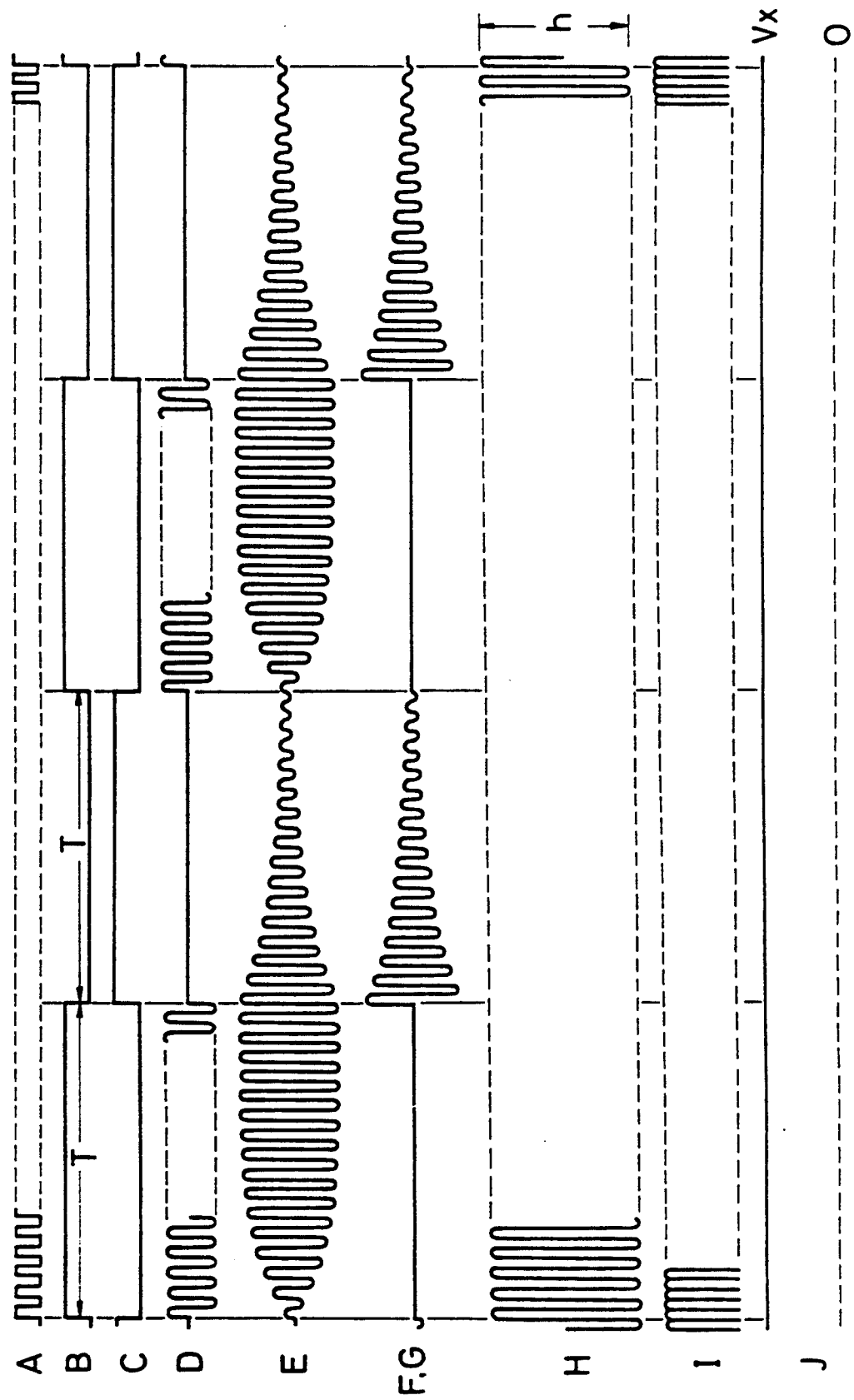
FIG. 6 is a waveform chart illustrating the waveforms of various signals available at various parts of the arrangement shown in FIG. 4.

The operation of this embodiment will be described hereinunder. The description will be first commenced with the description of the manner in which an electric wave is exchanged between the tablet 1 and the pen 2, as well as the signal which is obtained as a result of the signal exchange, with reference to FIG. 6. The control circuit 401 is constituted by a microprocessor which is known per se or an equivalent device. The control circuit 401 is designed to perform various controls such as the control of the timing circuit 404, control of the selection circuits 402x, 402y to enable them to switch-over the respective loop coils on the tablet 1, and control of the X-Y change-over circuit 405 and the receiving timing change-over circuit 408 for changing-over the direction in which the position is to be detected. The control circuit 401 also performs an analog-to-digital (A/D) conversion of the output values from the low-pass filters 413 to 415 and a later-mentioned arithmetic operation to compute the coordinate values of the position appointed by the pen 2. The control circuit 401 further discriminates the states of the switches and conducts various processings in accordance with the detected states of the switches.

The selection circuit 402x is designed to successively select one from the multiplicity of X-direction loop coils 11-1, 11-2, . . . , 11-48, while the selection circuit 402y successively selects one from the multiplicity of Y-direction loop coils 12-1, 12-2, . . . , 12-48.

These selection circuits 402x, 402y are adapted to operate in accordance with the information from a control circuit 401.

The transmission/receiving change-over circuit 403x is designed to connect one of the X-direction loop coils selected by the selection circuit 402x alternately to the driving circuit 406x and the amplifier 407x. Similarly, the transmission/receiving change-over circuit 403y is designed to connect one of the Y-direction loop coils selected by the selection circuit 402y alternately to the driving circuit 406y and the amplifier 407y. These transmission/receiving change-over circuits 403x, 403y operate in accordance with a later-mentioned transmission/receiving change-over signal.

The timing circuit 404 produces various signals including a rectangular wave signal A having a predetermined frequency $f_0$, e.g., 500 kHz, a signal A' (not shown) which is formed by delaying the rectangular wave signal A by a predetermined phase, a transmission/receiving change-over signal B of a predetermined frequency, e.g., 15.625 kHz, and a receiving timing signal C.

The rectangular wave signal A is on one hand delivered to the phase detection circuit 411 and on the other hand converted into a sine wave signal through a low-pass filter which is not shown. In addition, the rectangular wave signal A is transmitted to either one of the driving circuits 406x and 406y through the X-Y change-over circuit 405. On the other hand, the delayed rectangular wave signal A' is delivered to the phase detection circuit 412, while the transmission/receiving change-over signal B is delivered to the transmission/receiving change-over circuits 403x, 403y. The receiving timing signal C is supplied to the receiving timing change-over circuit 408.

It is assumed here that the control circuit 401 is delivering a signal for selecting the X-direction to the X-Y change-over circuit 405 and the receiving timing signal change-over circuit 408. In such a case, the sine wave signal is delivered to the driving circuit 406x so as to be converted into an equilibrium or balance signal which is then delivered to the transmission/receiving change-over circuit 403x. The transmission/receiving change-over circuit 403x operates in accordance wrth tne transmission/receiving change-over signal B so as to connect either one of the driving circuit 406x and the amplifier 407x. Therefore, the signal which is delivered by the transmission/receiving change-over circuit 403x to the selection circuit 402x is changed to a signal D which intermittently forms pulses of 500 kHz at a predetermined time interval T ($= \frac{1}{2}$ fk) which is in this case 32 $\mu$ sec.

The signal D is input through the selection circuit 402x to one of the loop coils 11-$i$ (i=1, 2, . . . . , 48) in the X-direction position detecting portion 11 of the tablet 1, so that the loop coil 11-$i$ produces an electric wave corresponding to the signal D.

It is also assumed here that the pen 2 is held in the vicinity of the loop coil 11-$i$ of the tablet 1 so as to face the tablet 1 across the display unit 3 substantially perpendicularly to the tablet, i.e., in the state of use. In such a case, the electric wave excites the coil 252 of the pen 2 so that an induction voltage E synchronous with the signal D is generated in the tuning circuit 25.

In the period in which the signal D has no pulse, i.e., in the period for receiving a signal, the loop coil 11-*i* is switched to be connected to the amplifier 407*x*, so that the electric wave from the loop coil 11-*i* is extinguished without delay, while the induction voltage E is progressively attenuated due to loss of energy in the tuning circuit 25.

Meanwhile, the electric current flcwing in the tuning circuit 25 in accordance with the induction voltage E produces an electric wave which is transmitted from the coil 252. This electric wave excited the loop coil 11-*i* connected to the amplifier 407*x* so that a voltage is induced in the loop coil 11-*i* corresponding to the electric wave from the coil 252. The induction voltage is delivered to the amplifier 407*x* through the transmission/receiving change-over circuit 403*x* only during the period for receiving, and forms a reception signal F. The reception signal F is delivered to a receiving timing change-over circuit 408.

The receiving timing change-over circuit 408 receives either one of the signal for selecting the X-direction and the signal for selecting the Y-direction. In this case, the signal for selecting the X-direction is received together with the receiving timing signal C which is formed by inverting the transmission/receiving change-over signal B. The receiving timing change-over circuit 408 delivers the reception signal F when the level of the signal C is high (H) but does not produce any signal when the level of the signal C is low (L), whereby a signal G which is materially the same as the reception signal F is obtained.

The signal G is delivered to the band-pass filter 409 which is a filter having a central frequency f0 so that it passes a signal H having an amplitude h corresponding to the energy of a frequency component f0 of the above-mentioned signal G to the detector 410 and the phase detectors 411, 412. Actually, several pulses of the signal G input to the filter 409 and converged by the filter are delivered to the detector 410 and the phase detectors 411, 412.

The signal H input to the detector 410 is detected and rectified to become a signal I which is input to the low-pass filter 413 having a sufficiently low cut-off frequency so as to be changed into a D.C. signal J having a voltage value Vx which substantially corresponds to ½ the amplitude h mentioned before. The thus formed D.C. signal J is delivered to the control circuit 401.

The voltage value Vx of the aforementioned signal J has a value which is proportional to the distance between the pen 2 and the loop coil 11-*i* and is changed in response to the change-over of the loop coil 11-*i*. The control circuit 401 operates to change the voltage value Vx derived from each loop coil into a corresponding digital value and then conducts an arithmetic operation on the thus obtained digital values thereby to compute the position appointed by the pen 2 in the X-direction. Similarly, the coordinate value of the position in the Y-direction also is computed in the same manner.

On the other hand, the phase detector 411 receives the rectangular wave signal A mentioned before. Therefore, if the switch 251 has been turned off and the phase of the signal H substantially coincides with the phase of the rectangular wave signal A, the phase detector 411 delivers a signal obtained by inverting the signal H to the positive side, i.e., a signal materially the same as the signal I. This signal is converted by the low-pass filter 414 similar to that described before into a D.C. signal (substantially the same as the signal J) having a voltage value substantially corresponding to ½ the amplitude h, and this signal is delivered to the control circuit 401.

The phase detector 412 receives the rectangular wave signal A' as the detection signal. If the switch 251 has been turned off as described before while the phase of the signal H is in advance of the phase of the rectangular wave signal A' by a predetermined angle, the phase detector 412 delivers a signal whihh has both positive and negative components. This signal is converted into D.C. signal by the low-pass filter 415 and is delivered to a control circuit 401. Since the output signal from the phase detection circuit 412 has both the positive and negative components, the voltage value of the output from the low-pass filter 415 is considerably small as compared with the value of the voltage which is obtained through the low-pass filter 414. As the switch 251 of the pen 2 is turned on in this state, the phase of the electric current flowing in the tuning circuit 25 is delayed from the induction voltage E so that the phase of the reception signal F also is delayed by a predetermined angle. Namely, the phase of the reception signal F becomes substantially the same as the phase of the rectangular wave signal A'.

As a result, the output H from the band-pass filter 409 is changed by the phase detector 411 into a signal having both the positive and negative components. At the same time, the voltage of the output from the low-pass filter 414 becomes substantially the same as that of the output from the low-pass filter 415 as obtained when the aforementioned switch 251 has been turned off. This signal, however, has been inverted to the positive side by the phase detector 412. On the other hand, the low-pass filter 415 delivers an output which is a D.C. signal having a voltage value substantially corresponding to ½ that of the amplitude h as explained before.

In consequence, the low-pass filter 414 produces an output of a predetermined voltage value when the switch 251 has been turned off, whereas, when the switch 251 has been turned on, a predetermined voltage value is obtained at the output of the low-pass filter 415. The control circuit 401 therefore can discriminate the state of the switch 251, i.e., whether this switch is on or off, through checking the output values from the low-pass filters 414 and 415.

The information indicating the on or off state of the switch 251 discriminated as explained above is used, for example, as the information which appoint the values to be actually input, among a plurality of pieces of coordinates values concerning the position appointment. A description will be given hereinunder as to the position detecting operation in the position detection circuit 4 and the state of the pen 2, with specific reference to FIGS. 7 to 9. The detail of discrimination of the state of the switch 251, as well as the operation of the whole apparatus, will be understood from the following description. When a position detecting instruction is given by the processing device 6 to the position detection circuit 4, the control circuit 401 delivers a signal for selecting the X-direction to the X-Y change-over circuit 405 and the receiving timing change-over circuit 408. At the same time, the control circuit 401 delivers to the selection circuit 402*x* an information for enabling the selection circuit 402*x* to select the first loop coil 11-1 from among the loop coils 11-1 to 11-48 of the tablet 1, and connects this loop coil 11-1 to the transmission/receiving change-over circuit 403*x*.

The transmission/receiving change-over circuit 403x operates to conduct a change-over to connect the loop coil 11-1 alternately to the driving circuit 406x and the amplifier 407x in accordance with the transmission/receiving change-over signal B mentioned before. Meanwhile, the driving circuit 406x delivers 16 pieces of sine wave signal of 500 kHz in the transmitting period of 32 μ sec, as shown in FIG. 7(a).

The change-over between the transmission and the receiving is repeated seven times for each loop coil, i.e., the loop coil 11-1 under description, as shown in FIG. 7(b). The total period of seven cycles of transmission and receiving corresponds to the period of selection of the single loop coil which is 448 μ sec. In this state, the amplifier 407x produces an induction voltage in each of the seven receiving periods for each of the loop coils. The induction voltages thus obtained are input through the receiving timing change-over circuit 408 to the band-pass filter 409 so as to be averaged by the latter, and is delivered to the control circuit 401 through the detector 410, phase detectors 411, 412 and the low-pass filters 413 to 415. The output value derived from the low-pass filter 413 is temporarily stored as the detection voltage, e.q., the voltage $V \times 1$ which is proportional to the distance between the pen 2 and the loop coil 11-1. (Actually, the analog values of the outputs from the low-pass filters 414 and 415 also are converted into digital values but these digital values are not adopted.)

Subsequently, the control circuit 401 delivers to the selection circuit 402x an information for enabling the selection circuit 402x to select the next loop coil 11-2 so that the loop coil 11-2 is connected to the transmission/receiving change-over circuit 403x thereby obtaining a detection voltage $V \times 2$ proportional to the distance between the pen 2 and the loop coil 11-2. The control circuit 401 then stores this detection voltage $V \times 2$. Similarly, the successive loop coils 11-3 to 11-48 are connected to the transmission/receiving change-over circuit 403x so that detection voltages $V \times 1$ to $V \times 48$ proportional to the distances between the pen 2 and the respective loop coils are stored. In FIG. 7(c), however, only part of these detection voltages are shown in an analog manner.

The detection voltages are actually obtainable only from several loop coils on both sides of the position (xp) where the pen is located, as will be seen from FIG. 8.

Subsequently, the control circuit 401 supplies both the X-Y change-over circuit 405 and the receiving timing change-over circuit 408 with a signal for selecting the Y-direction, thereby operating the selection circuit 402y and the transmission/receiving change-over circuit 403y in the same manner as that described before so as to successively select the loop coils 12-1 to 12-48. In consequence, detection voltages obtained through an A/D conversion of the outputs from the low-pass filter 413, corresponding to the distances between the pen 2 and the respective loop coils 12-1 to 12-48, are temporarily stored in the control circuit 401. The control circuit 401 then computes the coordinate values corresponding to the position of the pen 2 in the Y-direction.

Subsequently, the control circuit 401 delivers to the selection circuit 402x (or 402y) for selecting the loop coil 11-i (or 12-i) which has delivered the highest detection voltage from among the loop coils 11-1 to 11-48 in the X-direction (or loop coils 12-1 to 12-48 in the Y-direction). The control circuit 401 then repeats the transmission and receipt of the electric wave a plurality of times, e.g., seven times, and conducts A/D conversion of the output values derived from the low-pass filters 414 and 415. The control circuit 401 then conducts determines which one of the outputs from the low-pass filter 414 and the low-pass filter 415 is greater than a predetermined value, thus discriminating the state, i.e., on or off, of the switch 251.

The result of discrimination of the state of the switch 251 is delivered to the processing device 6 together with the coordinate values corresponding to the position of the pen 2 in X- and Y-directions.

When the first cycle of position detection and state discrimination is finished as described, the control circuit 401 commences a second and subsequent position detecting operation. Namely, the control circuit 401 delivers to the selection circuit 402x information for selecting a predetermined number of loop coils, e.g., 10 coils, on each side of the loop coil which has delivered the greatest detection voltage from among the X-direction loop coils 11-1 to 11-48. Similarly, the control circuit 401 delivers to the selection circuit 402y information for selecting a predetermined number of loop coils, e.g., 10 coils, on each side of the loop coil which has delivered the greatest detection voltage from among the Y-direction loop coils 12-1 to 12-48. Then, the detection of the position of the pen 2 both in the X- and Y-directions and the discrimination of the on-off state of the switch 251 are conducted in the same manner as that described before, and the thus obtained coordinate values and the result of the discrimination are transferred to the processing device 6 to renew the data. The control circuit 401 then repeats this operation. The term "level check" appearing in FIG. 9 is used to mean an operation for checking whether the greatest value of the detection voltage has reached the aforementioned detection level and to check which one of the loop coils has delivered the greatest value. If the detection level has not been reached, subsequent computation of the coordinates values is ceased and an operation is conducted to set the center of the group of loop coils which are to be selected in the next cycle of operation for detecting the position and discriminating the state of operation.

A method for determining the coordinate value in the X- or Y-direction, e.g., the aforementioned coordinates value xp, is to employ a suitable function which approximates the waveform near the maximum value of the detection voltages $V \times 1$ to $V \times 48$ and to determine the coordinates value of the maximum value of this function.

For instance, referring to FIG. 7(c), a curve section corresponding to the maximum value of the detection voltage $V \times 3$ can be approximated by a quadratic function. Using these quadratic functions, the coordinates value can be determined as follows.

$$V \times 2 = a(x2 - xp)^2 + b \quad (1)$$

$$V \times 3 = a(x3 - xp)^2 + b \quad (2)$$

$$V \times 4 = a(x4 - xp)^2 + b \quad (3)$$

where, the coordinates values of the centers of the loop coils 11-1 to 11-48 are represented by $\times 1$ to $\times 48$, respectively, while the pitch is represented by $\Delta x$.

In these formulae, symbols a and b represent, respectively, constant which meet the condition of ($a < 0$).

At the same time, the following conditions are met:

$$x3 - x2 = \Delta x \quad (4)$$

$$x4 - x2 = 2\Delta x \quad (5)$$

The following formula (6) is obtained by substituting the formulae (4) and (5) into the formulae (2) and (3):

$$xp = x2 + \Delta x/2$$
$$\{(3V \times 2 - 4V \times 3 + V \times 4)/(V \times 2 - 2V \times 3 + V \times 4)\}$$
tm (6)

It is therefore possible to determine the coordinates value xp corresponding to the position of the pen 2 by extracting the greatest detection voltage and the detection voltages derived from loop coils on both sides of the loop coil providing the greatest voltage from among the detection voltages $V \times 1$ to $V \times 48$, and conducting the computation of the formula (6) using the values of these detection voltages and the coordinates value (known) of the loop coil which is immediately before the loop coil which had given the greatest voltage.

Among the coordinates values of the position appointed both in X- and Y-directions, the values which have been delivered to the processing device 6 together with the result of discrimination of the state of the switch 251 are stored in a memory which is not shown, and is delivered to a display memory 502 in the display control circuit 5. These values are put in a predetermined order and stored in the display memory. The stored values are sequentially read in accordance with the timing pulses from the control circuit 501 and are delivered to the X-direction driver 503. The X-direction driver 503 and the Y-direction driver 504 receive scanning pulses which are generated by a scanning circuit 505 in synchronization with the timing pulses from the control circuit 501, and the drivers 503 and 504 drive the electrodes corresponding to the coordinate values of the appointed position on the display unit 3 both in the X- and Y-directions, thereby displaying the appointed position at the same point on the display unit 3 as the point on the tablet 1 which has been appointed by the pen 2.

In consequence, letters or patterns drawn by the focus on the pen 2 which has been kept in an on state and moved on the display unit 3 superposed on the tablet 1 are displayed by bright lines on the display unit 3.

On the other hand, the coordinates values of the appointed position in X- and Y-directions stored in the processing device 6 and other data formed on the basis of these coordinates values are delivered to the modulation circuit 701 of the acoustic coupler 7 so as to be modulated into signals of an acoustic band and are converted into acoustic signals through a speaker 702 so as to be sent to the opposite station through a telephone 8 and a telephone network 9. If the opposite station has the same coordinates input apparatus as that of the described embodiment, the letters and patterns are displayed on the display unit of the opposite station. On the other hand, coordinates values and data transmitted from the opposite station are input to the processing device 6 through the microphone 703 and the demodulating circuit 704 and are temporarily stored in the latter. The thus stored coordinator values and the data are then displayed on the display unit 3 through the display control circuit 5 in the same manner as that described before.

The processing device 6 may be designed to have an editing function for editing letters and/or a pattern processing function for processing patterns. In such a case, the letters and patterns input through the tablet 1 can be corrected, added or deleted as desired and the result of such an editorian or pattern-processing operation can be displayed simultaneously on the display unit 3 of the coordinates input apparatus of this station and on the display unit 3 of the opposite station.

The arrangement may be such that the tablet 1 or another portion of the apparatus is provided with a microphone, while the processing device 6 is equipped with an acoustic recognition function, so that various commands can be input by means of voice. It is also possible to provide the processing device 6 with a letter recognition function so as to be used as a letter recognition apparatus.

It is not always necessary that the area of the input region of the tablet 1 and the display area of the display unit 3 are equal. Namely, the size of the input region of the tablet 1 may be smaller or greater than the size of the display area of the display unit 3. In addition, it is not essential that the display unit 3 is superposed on the tablet 1.

The numbers of the loop coils employed in the described embodiment, as well as the manner in which these loop coils are arranged, are only illustrative and may be varied as desired.

What is claimed is:

1. A method of determining the position of an implement in proximity to a tablet, the implement including a tuned circuit with a predetermined resonant frequency, the tablet including coils arranged in two coordinate directions, comprising the steps of:

exciting at least some of the coils with AC energy having approximately the same frequency as the resonant freuqency, the tuned circuit interacting with the AC energy to change the AC current flowing in at least some of the coils as a function of the implement position relative to the tablet, and responding to the amplitude of AC current flowing in at least some of the coils to indicate the implement position by detecting the amplitude value of the current in a plurality of the coils and combining indications of the amplitude value of the curernt flowing in the plural coils.

2. The method of claim 1 wherein the implement position indication is enabled by detecting a predetermined phase relation for the current flowing in the coils.

3. The method of claim 1 wherein the implement position is indicated by interpolating betweent eh amplitude of the current flowing in adjacent coils.

4. The method of claim 1 wherein the position is indicated by detecting the amplitude of the current change in the coil having the greatest change and the amplitude of the current change in teh coils adjacent the coil having the greatest change, and interpolating between values of current chagne between the coil having the greatest change and the coils adjacent thereto.

5. The method of claim 4 wherein the change is detected by exciting the coils during a first interval with the AC energy at the predetermined frequency, and responding to energy coupled back to the coils from the tuned circuit during a second interval while the coils are not excited by the AC energy at the predetermined frequency.

6. The method of claim 1 wherein the coils are excited during a first interval with the AC energy at the predetermined frequency, and the indication is derived by responding to energy coupled back to the coils from the tuned circuit during a second interval while the coils are not exicted by the AC energy at the predetermined frequency.

7. The method of claim 1 wherein a display is superposed on the tablet, and responding to the indicated impelement position to indicate the position of the implement relative to the display.

8. The method of claim 1 wherein the coils are sequentially excited.

9. A method of determining the position of an implement in proximity to a tablet, the implement including a tuned cirucit with a resonant freuqency, the tablet including a series of coils arranged in two coordinate directions, comprising:
exciting at least some of the coils with AC energy having approximately the same frequency as the resonant frequency, the tuned circuit interacting with the AC energy to change the AC current flowing in at least some of the coils as a function of the implement position so that the greatest changes in the AC current are in the coils closest to the implement, and responding to the changes in AC current amplitude flowing in at least some of the coils as a result of the interaction of the tuned circuit and the AC energy exciting the coils to indicate the implement position by detecting the amplitude value for the current change in a plurality of the coils and combining indications of the amplitude value of the current change flowing in the plural coils.

10. The method of claim 9 wherein the position is indicated by detecting the amplitude of the current change in the coils having amplitude changes greater than a predetermined level, and interpolating between values of current amplitude change of the coils having amplitude changes greater than the predetermined value.

11. The method of claim 10 wherein the changes are detected by exciting the coils during a first interval with the AC energy at the predetermined frequency, and repsondig to energy coupled back to the coils from the tuned cirucit during a second interval while the coils are not excited by the AC energy at the predetermined frequency.

12. The method of claim 9 wherein the changes are detected by exciting the coils during a first interval with the AC energy at the predetermined frequency, and responding to energy coupled back to the coils from teh tuned circuit during a second interval while the coils are not excited by the AC energy at the predetermined frequency.

13. The method of claim 9 wherein the position is indicated by interpolating between values of current chagne of the coils.

14. The method of claim 13 wherein the changes are detected by exciting the coils during a first interval with the AC energy at the predetermined frequency, and repsonding to energy coupled back to the coils from the tuned circuit during a second interval while the coils are not excited by the AC energy at the predetermined frequency.

15. The method fo claim 9 further including detecting the phase change of AC current flowing in the coils in response to the interaction of the tuned circuit and AC current supplied by an exciting source of said same freqnecy.

16. The method of claim 15 wherein the implement position indication is enabled only in response to the phase change having a predetermined set of values.

17. The method of claim 9 wherein a display is superposed on the tablet, and responding to the indicated implement position to indicate the position of the implement relative to the display.

18. The method of claim 9 wherein the coils are sequentially excited.

19. In combination,
a tablet,
an AC energy source,
an implement adapted to be moved relative to a surface of the tablet, the implement including a tuned circuit with a resonant frequency, the tablet including a series of coils arranged behind the surface in two coordinate directions,
means for connecting at least some of the coils with the AC energy source, the source applying approximately the same frequency as the resonant frequency to the coils, the tuned circuit interacting with the AC energy to change the AC current flowing in at least some of the coils as a function fo the implement position, and
means responsive to the amplitude of the current in at least some of the coils for detecting the amplitude value of current flowing in a plurality of the coils and for combining the detected amplitude values of the currents flowing in the plural coils to indicate the position of the implement relative to the surface.

20. The combination of claim 19 wherein the means for detecting and combining detects the amplitude of the current change in the coil having the greatest change and the amplitude of the current change in the coils adjacent the coil having the greatest change and interpolates between values of curent change between the coils having the greatest changes and the coils adjacent thereto.

21. The combination of claim 20 wherein the means for connecting connects the AC source to the coils during a first interval and the means for detecting responds to energy coupled back to the coils from the tuned circuit during a second interval while the coils are not excited by the AC energy at the predetermined frequency.

22. The combination of claim 19 wherein the means for connecting connects the AC source to the coils during a first interval and teh means for detecitng repsonds to energy coupled back to teh coils from the tuned circuit during a second interval while the coils are not excited by the AC energy at the predetermined frequency.

23. The combination of claim 19 further including a display superposed on the tablet and means responsive to the detecting means for indicating implement position on the display.

24. The combination of claim 19 wherein the coils are sequentially connected to the AC source.

25. Apparatus for determining the position of an implement relative to a surface, the implement including a tuned circuit with a resonant frequency, comprising:
a tablet for carrying the surface, the tablet including a series of coils arranged in two coordinate directions of the surface,
means for exciting at least some of the coils with AC energy having approximately the same frequency as the resonant frequency, the tuned circuit interacting with the AC energy to change the AC current flowing in at least some fo the coils as a function of the implement position, and means responsive to the amplitude of the current flowing in at least some of the coils for detecting the amplitude value fo current flowing in a plurality of the coils and for combining the detected amplitude values fo the currents flowing in the plural coils to indicate the position of the implement relative to the surface.

26. The apparatus of claim 25 wherein the means for detecting and combining detects the amplitude of the current change in the coil having the greatest change and the amplitude of the current change in the coils adjacent the coil having the greatest change and interpolates between values of current chagne between the coil having the greatest changes and the coils adjacent thereto.

27. The apparatus of claim 26 wherein the means for connecting connects the AC source to the coils during a first interval and the means for signalling repsonds to energy coupled back to the coils from the tuned circuit during a second interval while the coils are not excited by the AC energy at the predetermined frequency.

28. The apparatus of claim 25 wherein the means for connecting connects the AC source to the coils during a first interval and the means for signalling repsonds to energy coupled back to the coils from the tuned circuit during a second interval while the coils are not excited by the AC energy at the predetermined frequency.

29. The apparatus of claim 25 further including a display superposed on the tablet, and means responsive to the detecting means for indicating implement position relative to the display.

30. The apparatus of claim 25 wherein the coils are sequentially excited with the AC energy.

31. In combination,
a tablet,
an AC energy source,
an implement adapted to be moved relative to a surface of the tablet, the implement including a tuned circuit with a resonant frequency, the tablet including a series of coils arranged in two coordinate directions of the surface,
means for connecting at least some of the coils with the AC energy source, the source applying approximately the same frequency as the resonant frequency to the coils, the tuned circuit interacting wtih the AC energy to change the AC current flowing in at least some of the coils as a function of the implement position, and
a display for indicating impeelment position relative to the surface in response to the change in AC current resulting from the interaction of the AC energy and the tuned circuit.

32. The combination of claim 31 wherein the means for connecting connects the AC source to the coils during a first interval and the display responds to energy coupled back to the coils from the tuned circuit during a second interval while the coils are not excited by the AC energy at the predetermined frequency.

33. The combination of claim 31 wherein the coils are sequentially connected with the AC energy source.

34. Apparatus for determining the position fo an implement relative to a surface, the implement including a tuned circuit with a resonant frequency, comprising:
a tablet carrying the surface, the tablet including a series of coils arranged in two coordinate directions of the surface,
means for exciting at least some of the coils with AC energy having approximately the same frequency as the resonant frequency, the tuned circuit interacting with the AC energy to change the AC current flowing in at least some of the coils as a function of the implement position, and
a display for indicating implement position relative to the surface in response to the change in AC current resulting from the interaction of the AC energy and the tuned circuit.

35. The apparatus of claim 34 wherein the means for exciting excites the coils during a first interval with the AC energy at the predetermined frequency and energy coupled back to the coils from the tuned circuit during a second interval while the coils are not excited by the AC energy at the predetermined frequency activates the display.

36. The apparatus of claim 34 wherein the coils are sequentially excited with the AC energy.

37. A method of determining the position of an implement relative to a tablet, the implement including a tuned circuit with a resonant frequency, the tablet including a series of coils arranged in two coordinate directions, comprising:
sequentially exciting at least some of the coils with AC energy having approximately the same frequency as the resonant frequency, the tuned circuit interacting with the AC energy to change the AC current flowing in at least some of the coils as a function of the implement position so that the greatest changes in the AC current are in the coils closest to the implement,
thereafter sequentially exciting only the coils having the greatest changes in AC current, and
responding to the amplitude of the AC curent flowing in at least some of the coils to detect the amplitude of the AC curent flowing in the coils and repsonding to the detected AC amplitude to indicate the implement position.

38. The method of claim 37 wherein the position is indicated by detecting the amplitude of the current change in the coil having the greatest change and the amplitude of the current change in the coils adjacent the coil having the greatest change, and interpolating between values of current change between the coil having the greatest change and the coils adjacent thereto.

39. The method of claim 27 wherein the change is detected by exciting the coils during a first interval with the AC energy at the predertermined frequency, and responding to energy coupled back to the coils from the tuned circuit during a second interval while the coils are not excited by the AC energy at the predetermined frequency.

40. In combination,
a tablet,
an AC energy source,
an implement adapted to be mvoed relative to a surface of the tablet, the implement incluiding a tuned circuit with a resonant frequency, the tablet including coils arranged in two coordinate directions relative to teh surface, and
means for connecting at least some of the coils with the AC energy source, the source applying approximately the same frequency as the resonant frequency to the coils, the tuned circuit interacting with the AC energy to change the AC current flowing in at least some of the coils as a function of the implement position so that the greatest changes in the AC current are in the coils closest to the implement, the means for connecting causing only the coils having the greatest changes in AC current amplitude to be connected to the AC source, and means responsive to the amplitude of the AC current flowing in the coils for detecting the amplitude of the AC current flowing in the coils and for signalling the implement position in response to the detected amplitude.

41. The combination of claim 40 wherein the means for signalling includes means for detecting the amplitude of the current change in the coil having the greatest change and the amplitude of the current change in the coils adjacent the coil having the greatest change and for interpolating between values of current change between the coil having the greatest change and the coils adjacent thereto.

42. The combination of claim 40 wherein the means for connecting connects the AC source to the coils during a first interval and the means for signalling responds to energy coupled back to the coils from the tuned circuit during a second interval while the coils are not excited by the AC energy at the predetermined frequency.

43. The combination of claim 40 wherein the coils are sequentially connected to the AC source.

44. Apparatus for determining the position of an implement relative to a surface, the implement including a tuned circuit with a resonant frequency, comprising:
a tablet carrying the surface, the tablet including coils arranged in two coordinate directions,
means for exciting at least some of the coils with AC energy having approximately the same frequency as the resonant freuqency, the tuned circuit interacting with the AC energy to change the AC curent flowing in at least some of the coils as a function of the implement position so that the greatest changes in the AC current are in the coils closest to the implement, said exciting means exciting only the coils having the greatest changes in AC current, and
means responsive to the amplitude of the AC current flowing in the coils having teh greatest chagnes in AC current for deriving responses indicative of the AC current amplitude flowing in the coils and repsonding to the responses for indicating the implement position.

45. The apparatus of claim 44 wherein the means for indicating implement position includes means for detecting hte amplitude of the AC current flowing in the coils.

46. The apparatus of claim 45 wherein the means for indicating implement position includes means for detecting the amplitude of the current change in the coil having the greatest change and the amplitude of the current change in the coils adjacent the coil having the greatest change and for interpolating between values of curent change between the coil having the greatest change and the coils adjacen thereto.

47. The apparatus of claim 44 wherein the means for indicating implement position includes means for exciting the coils during a first interval with the AC energy at the predetermined frequency and for responding to energy coupled back to the coils from the tuned circuit during a second interval while the coils are not excited by the AC energy at the predetermined frequency.

48. The apparatus of claim 44 wherein the coils are sequentially excited with the AC energy.

* * * * *

UNITED STATES PATENT AND TRADEMARK OFFICE
CERTIFICATE OF CORRECTION

PATENT NO. : 4,999,461
DATED : March 12, 1991
INVENTOR(S) : Murakami et al.

It is certified that error appears in the above-identified patent and that said Letters Patent is hereby corrected as shown below:

Title page,
Item [*] Notice, please delete "The portion of the term of this patent subsequent to Jul. 18, 2006 has been disclaimed.", and insert -- This patent is subject to a terminal disclaimer. --

Signed and Sealed this

Thirty-first Day of May, 2005

JON W. DUDAS
*Director of the United States Patent and Trademark Office*